Figure 1:
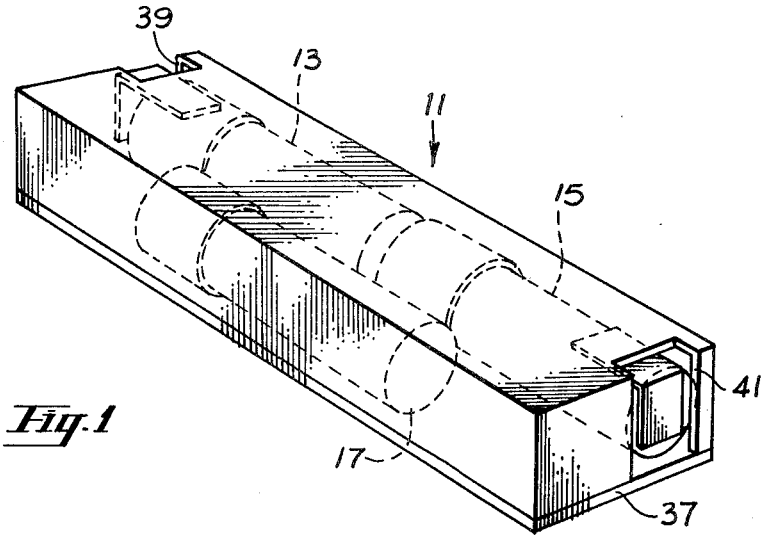
Figure 2:
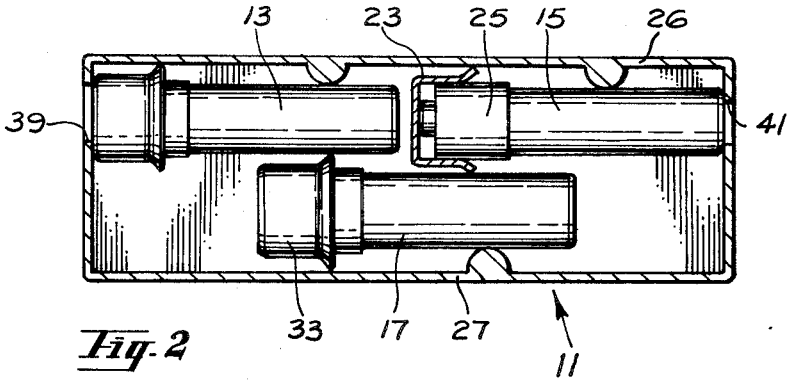
Figure 3:
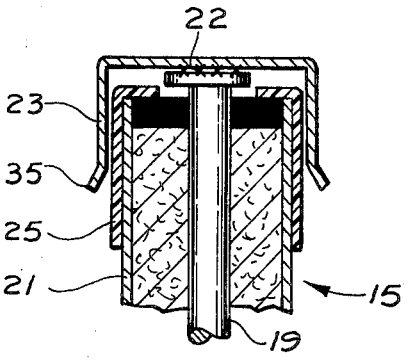

United States Defensive Publication [19] (H) [11] T990,007

Sethi [43] Jan. 1, 1980

[54] ELECTROCHEMICAL CELL AND BATTERY

[76] Inventor: Gurdip S. Sethi, 1669 Lake Ave., Rochester, N.Y. 14650

[21] Appl. No.: 47,398

[22] Filed: Jun. 11, 1979

[51] Int. Cl.[2] ..... H01M 2/24

[52] U.S. Cl. ..... 429/158

[57] ABSTRACT

An electrochemical cell, including a current-collecting rod of one polarity received within a cylindrical current-collecting sleeve of opposite polarity, is provided with a conductive flared end cap welded to one end of the rod and extending concentrically around one end of the sleeve a band of insulating material, such as plastic shrink wrap, extends between the cap and the sleeve to prevent shorting. When assembled in an appropriate housing with other such cells, the end caps engage adjacent sleeves to provide series electrical connections between the cells. Preferably, the flared ends of the caps include a sharp edge that gouges into the adjacent sleeve to reduce the contact resistance.

5 Claims, 1 Sheet Drawing,

7 Pages Specification

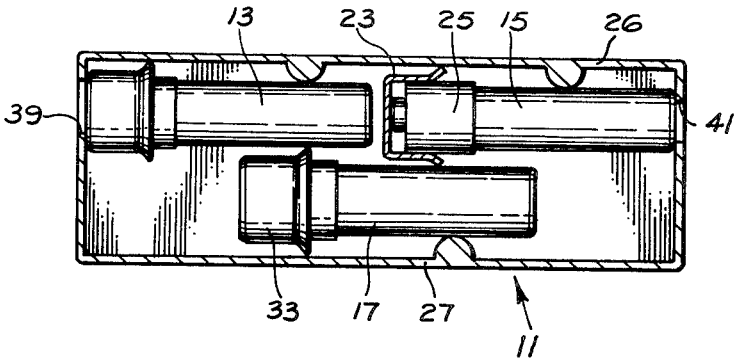

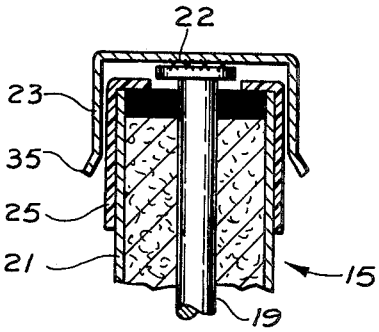

The file of this unexamined application may be inspected and copies thereof may be purchased (849 O.G. 1221, Apr. 9, 1968).